US009005342B2

(12) United States Patent
Shimazaki et al.

(10) Patent No.: US 9,005,342 B2
(45) Date of Patent: Apr. 14, 2015

(54) FILTER AND METHOD OF THE SAME (71) Applicant: Hitachi, Ltd., Chiyoda-ku, Tokyo (JP)

(72) Inventors: Yuzuru Shimazaki, Naka-gun (JP); Ryuta Washiya, Hitachi (JP); Masahiko Ogino, Hitachi (JP); Akihiro Miyauchi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 13/728,737

(22) Filed: Dec. 27, 2012

(65) Prior Publication Data

US 2013/0167494 A1 Jul. 4, 2013

(30) Foreign Application Priority Data

Dec. 28, 2011 (JP) ................. 2011-287254

(51) Int. Cl.
*B01D 46/00* (2006.01)
*B01D 71/06* (2006.01)
*B01D 69/10* (2006.01)
*B01D 63/08* (2006.01)
*B01D 67/00* (2006.01)
*B01D 69/06* (2006.01)
*B01D 39/14* (2006.01)

(52) U.S. Cl.
CPC ............ *B01D 46/0002* (2013.01); *B01D 71/06* (2013.01); *B01D 69/10* (2013.01); *B01D 63/08* (2013.01); *B01D 67/0023* (2013.01); *B01D 69/06* (2013.01); *B01D 63/088* (2013.01); *B01D 63/081* (2013.01); *B01D 63/087* (2013.01); *B01D 2325/028* (2013.01); *B01D 39/14* (2013.01)

(58) Field of Classification Search
CPC .... B01D 63/08; B01D 63/081; B01D 63/087; B01D 63/088; B01D 67/0023; B01D 67/0025; B01D 69/06; B01D 69/10; B01D 71/06; B01D 2325/028
USPC ...................... 96/4, 11, 12; 55/492, 522, 529
See application file for complete search history.

(56) References Cited

U.S. PATENT DOCUMENTS

| | | | | |
|---|---|---|---|---|
| 4,872,888 | A * | 10/1989 | Ehrfeld et al. | 210/500.35 |
| 7,282,148 | B2 * | 10/2007 | Dalton et al. | 210/500.25 |
| 7,442,303 | B2 * | 10/2008 | Jacobson | 210/510.1 |
| 7,531,120 | B2 * | 5/2009 | Van Rijn et al. | 264/299 |
| 7,655,075 | B2 * | 2/2010 | Hofmann | 96/4 |
| 7,784,619 | B2 * | 8/2010 | Jacobson | 210/500.22 |

(Continued)

OTHER PUBLICATIONS

Kingo Itaya et al., "Properties of Porous Anodic Aluminum Oxide Films As Membranes", Journal of Chemical Engineering of Japan, vol. 17, No. 5, 1984, pp. 514-520.

*Primary Examiner* — Robert Clemente
(74) *Attorney, Agent, or Firm* — Crowell & Moring LLP (57) ABSTRACT

The present invention is characterized in that a filter made of resin comprises a through-hole film portion (14); and a structure reinforce portion (13), wherein a through-hole (15) is provided in a through-hole film portion (14), the thickness of the through-hole film portion (14) is from 0.5 to 2.0 μm, the bore of the through-hole (15) is from 0.05 to 0.5 μm, the thickness of the structure reinforce portion (13) is bigger than the thickness of the through-hole film portion (14), the structure reinforce portion (13) encloses the through-hole film portion (14), a damage-reduction structure is provided on the upper surface of the structure reinforce portion (13), and wherein, the damage-reduction structure may be an uneven structures.

19 Claims, 4 Drawing Sheets

(56) References Cited

U.S. PATENT DOCUMENTS

| | | | |
|---|---|---|---|
| 8,361,196 B2 * | 1/2013 | Schwartz et al. | 95/45 |
| 8,758,542 B2 * | 6/2014 | Gong et al. | 156/245 |
| 2008/0083697 A1 * | 4/2008 | Dalton et al. | 216/2 |
| 2010/0084333 A1 * | 4/2010 | Hoogerwerf et al. | 210/490 |
| 2010/0181288 A1 * | 7/2010 | Tang et al. | 216/45 |

* cited by examiner

FILTER AND METHOD OF THE SAME

BACKGROUND OF THE INVENTION

1. Field of the Invention

The present invention relates a filter, particularly a filter with a through-hole.

2. Description of the Related Art

Various techniques about the air cleaning in the living space are traditionally developed from long ago. The filter formed of the thin film with a through-hole is mainly used to filter the components in a solution, and the filter that comprises the through-hole structure formed by an aluminum anodic oxide coating is on the market. On the other hand, except for the filtering by making use of the difference of the through-hole size, there is a reference described about the filter, which comprises a through-hole and selectively filters the gas molecules by making use of the difference of the gas diffusion rate in the through-hole. A non-patent literature 1 reports that it is possible to filter the gases which have various molecular weights by using the thin film which is made of aluminum anodic oxide and whose bore is about 20 nm. This filter makes use of the fact that the gas diffusion velocity in the through-hole is in proportion to the molecular weight of the gas to the $-\frac{1}{2}$th power, in case that the bore of the through-hole is corresponding to the mean free path of the gas (the bore of the through-hole is about 70 nm in the case of atmospheric gas).

The title of non-patent literature 1 is "Journal of Chemical Engineering of Japan 17,514 (1984)".

It is effective to use flexible resin material in order to mass-produce the filter making use of the filtering by the difference of the size and the difference of gas diffusion velocity. On the other hand, in the filter with a fine through-hole, it is necessary to thin the thickness of a through-hole film portion to about from 0.5 to 2 μm, in terms of the increase of the gas permeability rate after filtering. Therefore, it is necessary to contrive in order not to damage the filter, when the mechanical strength of the filter is weak and a plurality of filters is used by being stacked one on another, or the filter is wound by a reel at the time of manufacture. There is a way to form a structure reinforce portion whose thickness is large side by side with the through-hole film portion in the filter as a typical way to give the mechanical strength to the filter with the fine through-hole. But, for example, there is a problem that the upper surface of structure reinforce portion damages the filter which is adjacent to the structure reinforce portion when the filter is wound by the reel, and the yield rate of the filter with fine through-hole declines.

The object of the present invention is to offer the resin filter with fine through-hole whose damage is reduced.

SUMMARY OF THE INVENTION

To solve the above problem, the present invention is characterized in that a filter made of resin comprising: a through-hole film portion (14); and a structure reinforce portion (13), wherein a through-hole (15) is provided in a through-hole film portion (14), the thickness of the through-hole film portion (14) is from 0.5 to 2.0 μm, the bore of the through-hole (15) is from 0.05 to 0.5 μm, the thickness of the structure reinforce portion (13) is bigger than the thickness of the through-hole film portion (14), the structure reinforce portion (13) encloses the through-hole film portion (14), a damage-reduction structure is provided on the upper surface of the structure reinforce portion (13), and wherein, the damage-reduction structure is at least one of an uneven structures, a low surface energy layer whose surface energy is smaller than the surface energy of the structure reinforce portion (13), and a low elastic modulus layer whose elastic modulus is smaller than the elastic modulus of the structure reinforce portion (13).

Also, the present invention is characterized in that the filter comprises a protrusion (16), the protrusion (16) is provided on the edge of the through-hole (15) in the through-hole film portion (14), and wherein, the height of the protrusion (16) is from 2 to 20 nm.

The present invention reduces the damage of the resin filter with the fine through-hole.

DETAILED DESCRIPTION OF THE PREFERRED EMBODIMENTS

The embodiments of the filter with a fine through-hole according to the present invention are discussed below.

The filter with the fine through-hole in an embodiment of the present invention comprises a through-hole film portion in which the fine through-hole is formed, a structure reinforce portion which encloses the through-hole film portion, and a filter damage reduction structure which is provided in the upper surface of the structure reinforce portion. The filter in an embodiment of the present invention has flexibility and is made of the resin which is easy to handle. Inorganic materials may be included in the resin to the extent not to reduce the flexibility of the filter to increase the strength of the filter. Examples of the resin include acrylic resin, methacrylic resin, silicone resin which is polydimethylsiloxane and silsesquioxane, and so forth, epoxy resin, urethane resin, and fluoridation resin. Examples of inorganic material which can be included in the resin include silicon oxide, aluminum oxide, titanium oxide, and carbon nano-tube.

It is preferable that the thickness of the through-hole film portion is from 0.5 to 2 μm. If the thickness of the through-hole film portion is less than 0.5 μm, the strength of the through-hole film portion is insufficient, the through-hole film portion becomes fragile and is not worthy of practical use. If the thickness of the through-hole film portion is more than 2 μm, the gas permeability reduces, so it is not preferable. It is preferable that the bore of the through-hole which is included in the through-hole film portion is from 0.05 to 0.5 μm, the bore of the through-hole is selected dependent on the size of the gas to filter or the size of impurities (which is air pollutants and so forth) which are filtering objects and included in the gas. Particularly, in the filter, which selectively filters the gas molecules by making use of the difference of the gas diffusion velocity in the through-hole, it is preferable that the bore of the through-hole in through-hole film portion is about from 0.05 to 0.15 μm, and the aspect ratio of the through-hole is about 10 (the thickness of the through-hole film portion is about from 0.5 to 1.5 μm). A plurality of the through-holes is disposed along the normal direction to the filter surface.

The through-hole ratio of the filter in an embodiment of the present invention (the percentage of the through-hole area in the filter gross area) is from 5 to 15%. In the filter in an embodiment of the present invention, a plurality of the through-holes are disposed along the normal direction to the filter surface (the through-hole film portion), so gas is easier to flow in the filter than the filter with the through-hole whose direction is not controlled, and sufficient amount of the gas transport can be ensured in the through-hole ratio of from 5 to 15%. If the through-hole ratio is less than 5%, the gas permeability reduces, so it is not preferable. If the through-hole ratio is more than 15%, the strength of through-hole film portion is insufficient, the filter becomes fragile and is not worthy of practical use.

The structure reinforce portion is a structure whose thickness is bigger than the thickness of the through-hole film portion, and the structure reinforces the strength of the through-hole film portion by disposing the structure so that the structure reinforce portion encloses through-hole film portion. The thickness of the structure reinforce portion is not particularly limited as long as the structure reinforce portion can reinforce the through-hole film portion, it can be selected dependent on the use of the filter. The structure reinforce portion area is established to ensure the strength of the filter and that the through-hole ratio of the filter is from 5 to 15%. It is preferable that the structure reinforce portion and the through-hole film portion are made of the same resin material and integral molding to increase the strength of the filter. That is, it is preferable that the structure reinforce portion and the through-hole film portion are uniformed. The filter in the present invention comprises a damage-reduction structure on the upper surface of the structure reinforce portion. The damage-reduction structure is provided to reduce damage of the filter with the through-hole in the present invention. Examples of the major cause of the filter damage include the damage that is caused by the bond strength of the contact surface when the filter is delaminated after the filter and another filter touch or the filter and other components touch, and the damage by the stress fracture in the contact portion. Therefore, filter damage is reduced by providing the damage-reduction structure which has at least one of the function to reduce the bond strength when the filter and another filter touch, and the function to attain the stress relaxation.

Examples of the damage-reduction structure which has the function to reduce the bond strength when the filter and another filter touch include making the contact surface area smaller. Concretely, the structure whose upper surface area is smaller than the cross sectional area of the structure reinforce portion is provided as the damage-reduction structure. Concretely, the uneven structure is provided on the upper surface of the structure reinforce portion. For example, Examples of the uneven structures include the structure which has a convex surface (saddling curved surface), and the structure which has a concave surface (half-pipe shaped curved surface), regarding both ends of the upper surface of the structure reinforce portion as joints.

Other examples of the damage-reduction structure which has the function to reduce the bond strength when the filter and another filter touch include making the bond strength of the upper surface of the structure reinforce portion smaller by making the surface energy of the upper surface of the structure reinforce portion smaller. Concretely, a low surface energy layer whose surface energy is lower than the surface energy of the structure reinforce portion is provided on the upper surface of the structure reinforce portion. On this occasion, it is preferable that the surface energy of the low surface energy layer is 30 or less $mJ/m^2$. Examples of materials of the low surface energy layer include fluorine-based resin including perfluoropolyether.

Examples of the damage-reduction structure which has the function to attain the stress relaxation in the contact portion include providing a low elastic modulus layer whose elastic modulus is lower than the elastic modulus of the structure reinforce portion on the upper surface of the structure reinforce portion. On this occasion, it is preferable that the elastic modulus of the low elastic modulus layer is 500 or less MPa. Examples of materials of the low elastic modulus layer include elastomeric material including silicone rubber represented by polydimethylsiloxane.

As stated above, the damage-reduction structure in the present invention comprises at least one of the uneven structure provided on the upper surface of the structure reinforce portion, the low surface energy layer, and the low elastic modulus layer.

Examples of the manufacturing method of the filter with the through-hole include nano-imprint method that the structure is formed by transferring the shape of the mold to the resin, and nano-cast method that the resin poured into the mold is hardened and the resin is delaminated from the mold after hardening. In the case of producing the filter in the present invention by the nano-imprint method, the filter is produced as follows. The structure of the mold is transferred to the resin for the material of the filter on the base film on which a sacrificial layer is applied. After that, the sacrificial layer is dissolved and the filter is produced. It's no problem at all, if the sacrificial layer is made of the material which is soluble in the solvent in which the filter is not soluble. For example, in the case that the filter is not soluble in water, examples of the sacrificial layers include the resin which is soluble in water including polyvinyl alcohol, polydimethyl acrylamide, and polyvinyl pyrrolidone.

The other embodiments of the filter with the fine through-hole according to the present invention are discussed below. Unfortunately, in the filter with the fine through-hole whose bore is from 0.05 to 0.5 μm, the adsorption of the air pollutants to the through-hole film portion, which generally results in no problem, has a large impact on the gas permeability of the filter with the fine through-hole. In contrast, the adsorption of the air pollutants is suppressed by providing a protrusion whose height is from 2 to 20 nm on the edge of the inferior surface of the through-hole in the through-hole film portion. That is why when the protrusion is formed on the edge of the through-hole, the clearance between the filter surface (the through-hole film portion surface) and the air pollutants is formed, and the contact area between the air pollutants and the filter surface reduces. By doing so, Van der Waals force acting between the air pollutants and the filter surface is suppressed and the adsorption of the air pollutants is suppressed. In this occasion, if the height of the protrusion is less than 2 nm, the effect of suppressing the adsorption of the air pollutants is not gained, because the clearance between the filter surface and the air pollutants is not sufficiently formed when the air pollutants including exhaust particles contact on the edge of the inferior surface in the through-hole, and Van der Waals force acting between the air pollutants and the filter surface is not sufficiently suppressed. If the height of the protrusion is more than 20 nm, the permeable gas doesn't enter the through-hole well, and the gas permeability reduces, so it is not preferable. Therefore, it is preferable that the height of the protrusion on the edge of the through-hole is from 2 to 20 nm. The height of the protrusion in the present invention is controlled by the fabrication condition of the filter. For example, in the case of producing the filter by the nano-imprint method, it is possible to control the height of the protrusion by controlling the pressure when the mold is pressed force. In this case, the bigger the pressure when the mold is pressed force is, the bigger the height of the protrusion is.

Hereinafter, the present invention and the effect of the present invention will be explained by using embodiments and comparative examples, but the content of the present invention is not limited to these embodiments.

Figure 1:
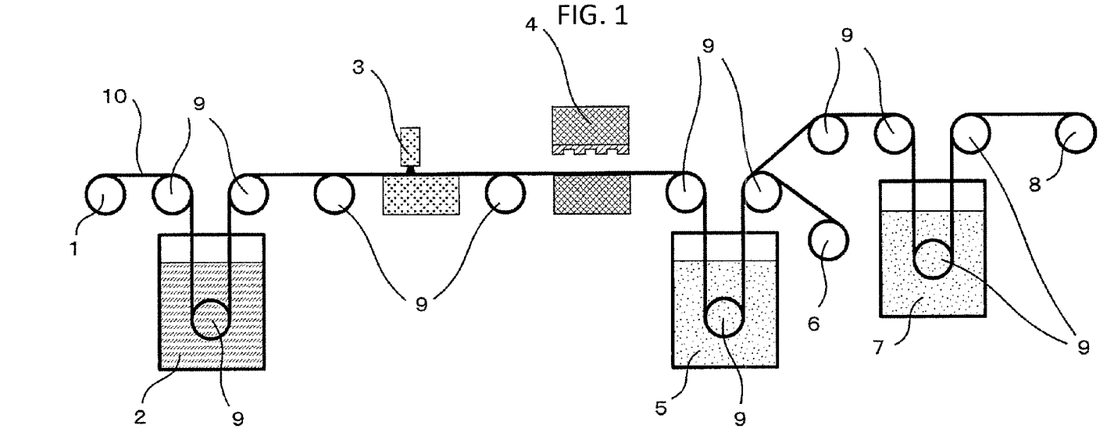
FIG. 1 is a schematic diagram of the manufacturing equipment to produce the filters in one embodiment and in comparative example.
Figures 2A, 2D:
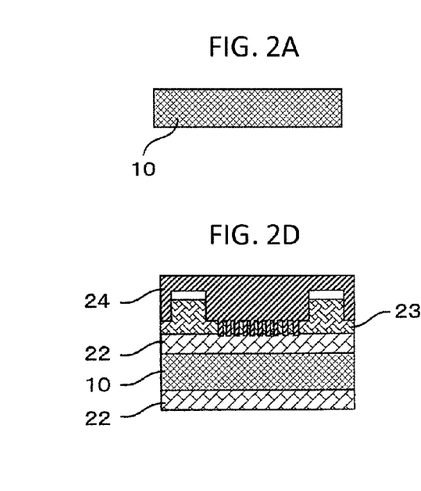
FIG. 2 is a schematic cross section illustrating the manufacturing process of the filter.
Figure 2B:
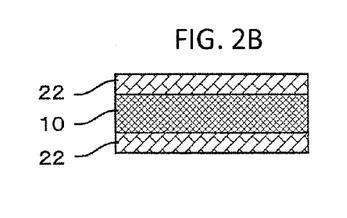
Figure 2C:
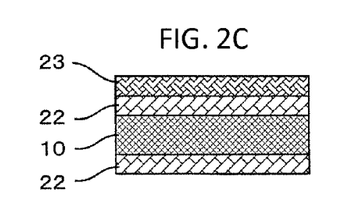
Figure 2E:
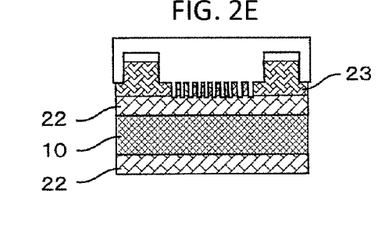
Figure 2F:
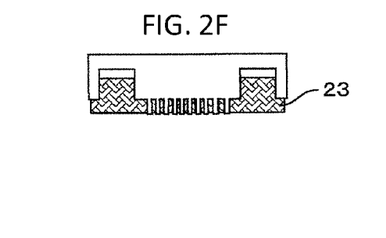

In one embodiment and comparative, the filter with the fine through-hole was produced by using the manufacturing equipment of roll-to-roll process illustrated in FIG. 1. FIG. 2 illustrates a schematic cross section of each process in roll-to-roll process. Firstly, a PET film 10 (having a length of 30 m, a width of 15 cm, and a thickness of 100 μm) wound to a PET film winding reel 1 was dipped in a bath 2 containing polyvinyl alcohol solution, and a polyvinyl alcohol resin film 22 corresponding to a sacrificial layer whose thickness is 1 μm was formed on a PET film 10 (refer to FIG. 2A and FIG. 2B). After that, a resin 23 for the material of the filter with the fine through-hole was applied on the polyvinyl alcohol resin film 22 by using a resin coating machine 3 (refer to FIG. 2C). After that, a nickel mold, which was treated with by fluorochemical releasing agent, was pressed force and delaminated by using a fine structure formation apparatus 4, and the mold structure was transferred to the resin 23 (refer to FIG. 2D and FIG. 2E). In this occasion, welding pressure, the thickness of the resin 23, or the quantity of the resin 23 is adjusted so that the protrusion of the mold to form the through-hole in the through-hole film portion reaches the polyvinyl alcohol resin film 22 corresponding to the sacrificial layer. As illustrated in FIG. 2D, it is possible to provide a saddling curved or a half-pipe shaped damage-reduction structure on the upper surface of the structure reinforce portion as described below, if the resin is not completely filled in the concave portion of the mold to form structure reinforce portion. It is also possible to provide a damage-reduction structure with a predetermined uneven structure on the upper surface of the structure reinforce portion by the transferring process in one embodiment, by forming uneven pattern in the concave portion of the mold to form the structure reinforce portion Next, after the uneven pattern was transferred to the resin by using the fine structure formation apparatus 4, the polyvinyl alcohol resin film 22 was solved by dipping a sheet in a bathtub 5, and the resin 23 to which the structure was transferred was delaminated from the PET film 10 (refer to FIG. 2F). After that, the resin 23 to which the structure was transferred was collected by a film winding reel 8, after the polyvinyl alcohol resin film 22 which was remaining on the surface of the filter was solved by dipping the resin 23 in a bathtub 7. PET film was collected by a film winding reel 6. In roll-to-roll process, the transportation of the film to each process was performed by a film transporting roll 9. In the case that the mold structure was transferred to the resin, depending on the type of the resin, a process (photo-curing process), that the mold is delaminated after the resin is given ultra-violet irradiation and hardened when the mold is pressed force, or a process (heating process), that the mold is delaminated after the mold is pressed force to the resin whose temperature is more than the glass-transition temperature of the resin and the resin is cooled, is used. In the case of the photo-curing process, the fine structure formation apparatus 4 comprises photo irradiation means to harden ultra-violet curable resin. In the case of the heating process, the fine structure formation apparatus 4 comprises heating means to soften thermoplastics resin and cooling means to cool the thermoplastics resin. A formation apparatus which presses force by using the tabular mold, or a roller-type formation apparatus which uses a roll state mold or a belt state mold is used as the fine structure formation apparatus 4.

Figures 3, 4:
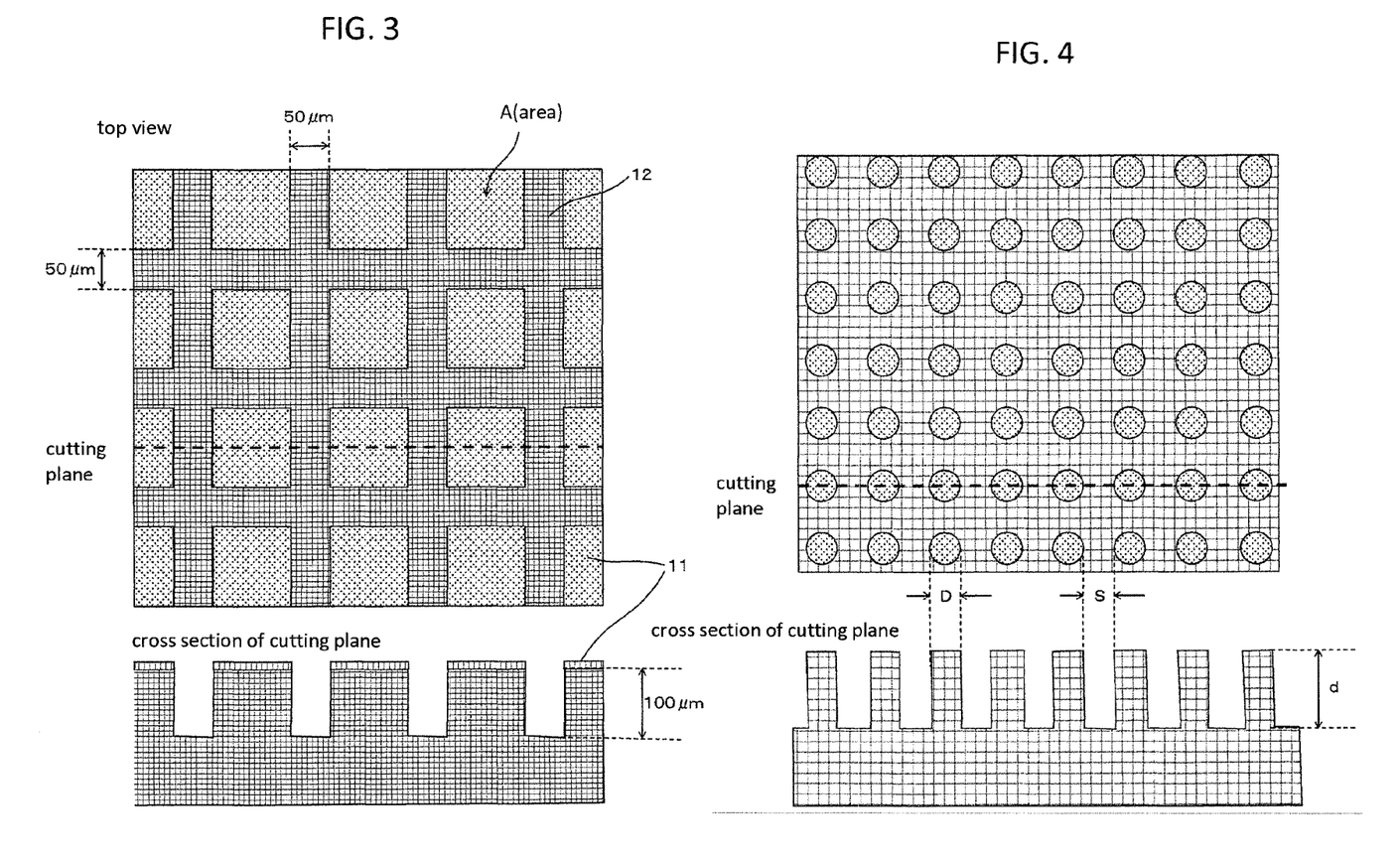
FIG. 3 is a schematic diagram (enlarged view) of a mold.
FIG. 4 is a schematic diagram (enlarged view) of the part to form the through-hole film portion in the mold.

The mold in one embodiment and comparative comprises a part 11 to form the through-hole film portion and a part 12 to form the structure reinforce portion. FIG. 3 illustrates a schematic diagram (enlarged view) of the mold and FIG. 4 illustrates a schematic diagram (enlarged view) of the part 11 to form the through-hole film portion in the mold. A plurality of the parts 11 to form the through-hole film portion is divided by the part 12 to form the structure reinforce portion, and the area of a unit is A. As illustrated in FIG. 4, the part 11 to form the through-hole film portion comprises the structure that cylindrical pillars having a diameter of D, an interval of S, and a height of d are regularly disposed. The structure reinforce portion comprises the groove structure having a width of 50 μm and a depth of 100 μm. In one embodiment and comparative comprises, the filter was produced by the various molds with the cylindrical pillars to form the through-hole film portion having various diameters of D, various intervals of S, and various heights of d. TABLE. 1 illustrates size parameters of the molds in embodiments and comparative comprises. TABLE. 2 illustrates the results of measuring the form parameter of the produced filters by atomic force microscope and palpation type film thickness gauge.

TABLE 1

| | | through-hole film portion | | | | | structure reinforce portion | |
|---|---|---|---|---|---|---|---|---|
| | resin material | through-hole ratio [%] | height of pillar d [μm] | diameter of pillar D [μm] | interval of pillar S [μm] | area of portion enclosed structure reinforce portion A [μm²] | height H [μm] | width W [μm] |
| compatarive example 1 | resin A | 10 | 1 | 0.1 | 0.2 | 14400 | 100 | 50 |
| embodiment 1 | resin A | 10 | 1 | 0.1 | 0.2 | 14400 | 100 | 50 |
| embodiment 2 | resin A | 10 | 0.5 | 0.1 | 0.2 | 14400 | 100 | 50 |
| embodiment 3 | resin A | 10 | 2 | 0.1 | 0.2 | 14400 | 100 | 50 |
| embodiment 4 | resin A | 10 | 1 | 0.05 | 0.1 | 14400 | 100 | 50 |
| embodiment 5 | resin A | 10 | 1 | 0.5 | 1 | 14400 | 100 | 50 |
| embodiment 6 | resin A | 5 | 1 | 0.1 | 0.2 | 2500 | 100 | 50 |
| embodiment 7 | resin A | 15 | 1 | 0.1 | 0.2 | 122500 | 100 | 50 |
| embodiment 8 | resin B | 10 | 1 | 0.1 | 0.2 | 14400 | 100 | 50 |

TABLE 1-continued

| | | through-hole film portion | | | | | |
| --- | --- | --- | --- | --- | --- | --- | --- |
| | | | | | | area of portion enclosed structure reinforce | structure reinforce portion | |
| | resin material | through-hole ratio [%] | height of pillar d [μm] | diameter of pillar D [μm] | interval of pillar S [μm] | portion A [μm²] | height H [μm] | width W [μm] |
| embodiment 9 | resin A | 10 | 1 | 0.1 | 0.2 | 14400 | 100 | 50 |
| embodiment 10 | resin A | 10 | 1 | 0.1 | 0.2 | 14400 | 100 | 50 |
| embodiment 11 | resin C | 10 | 1 | 0.1 | 0.2 | 14400 | 100 | 50 |
| embodiment 12 | resin D | 10 | 1 | 0.1 | 0.2 | 14400 | 100 | 50 |

TABLE 2

| | | through-hole film portion | | | | | structure reinforce portion | | | | | number of flaws whose size are 1 μm and more in filter surface whose area is 1 mm² |
| --- | --- | --- | --- | --- | --- | --- | --- | --- | --- | --- | --- | --- |
| | | | height of pillar d [μm] | diameter of pillar D [μm] | interval of pillar S [μm] | area of portion enclosed structure reinforce portion A [μm²] | maximum height H' [μm] | minimum height H' [μm] | width W' [μm] | shape of upper surface | other feature | |
| | resin material | through-hole ratio [%] | | | | | | | | | | |
| comparative example 1 | resin A | 10 | 1 | 0.1 | 0.2 | 14400 | 100 | 100 | 50 | plane | — | 15 |
| embodiment 1 | resin A | 10 | 1 | 0.1 | 0.2 | 14400 | 91 | 86 | 50 | saddling curved surface | — | 1 |
| embodiment 2 | resin A | 10 | 0.5 | 0.1 | 0.2 | 14400 | 90 | 85 | 50 | saddling curved surface | — | 2 |
| embodiment 3 | resin A | 10 | 2 | 0.1 | 0.2 | 14400 | 91 | 84 | 50 | saddling curved surface | — | 1 |
| embodiment 4 | resin A | 10 | 1 | 0.05 | 0.1 | 14400 | 90 | 84 | 50 | saddling curved surface | — | 1 |
| embodiment 5 | resin A | 10 | 1 | 0.5 | 1 | 14400 | 92 | 85 | 50 | saddling curved surface | — | 2 |
| embodiment 6 | resin A | 5 | 1 | 0.1 | 0.2 | 2500 | 91 | 80 | 50 | saddling curved surface | — | 1 |
| embodiment 7 | resin A | 15 | 1 | 0.1 | 0.2 | 122500 | 95 | 88 | 50 | saddling curved surface | — | 1 |
| embodiment 8 | resin B | 10 | 1 | 0.1 | 0.2 | 14400 | 85 | 90 | 50 | half-pipe shaped curved surface | — | 2 |
| embodiment 9 | resin A | 10 | 1 | 0.1 | 0.2 | 14400 | 100 | 100 | 50 | plane | low surface energy layer whose thickness is 2 nm is formed on upper surface of structure reinforce portion | 1 |
| embodiment 10 | resin A | 10 | 1 | 0.1 | 0.2 | 14400 | 101 | 101 | 50 | plane | low surface energy layer whose thickness is 1 nm is formed on upper surface of | 1 |

TABLE 2-continued

| | resin material | through-hole ratio [%] | through-hole film portion | | | | structure reinforce portion | | | | | number of flaws whose size are 1 μm and more in filter surface whose area is 1 mm2 |
| | | | height of pillar d [μm] | diameter of pillar D [μm] | interval of pillar S [μm] | area of portion enclosed structure reinforce portion A [μm²] | maximum height H' [μm] | minimum height H' [μm] | width W' [μm] | shape of upper surface | other feature | |
|---|---|---|---|---|---|---|---|---|---|---|---|---|
| embodiment 11 | resin C | 10 | 1 | 0.1 | 0.2 | 14400 | 90 | 85 | 50 | saddling curved surface | structure reinforce portion — | 1 |
| embodiment 12 | resin D | 10 | 1 | 0.1 | 0.2 | 14400 | 92 | 87 | 50 | saddling curved surface | — | 2 |

Figure 5:
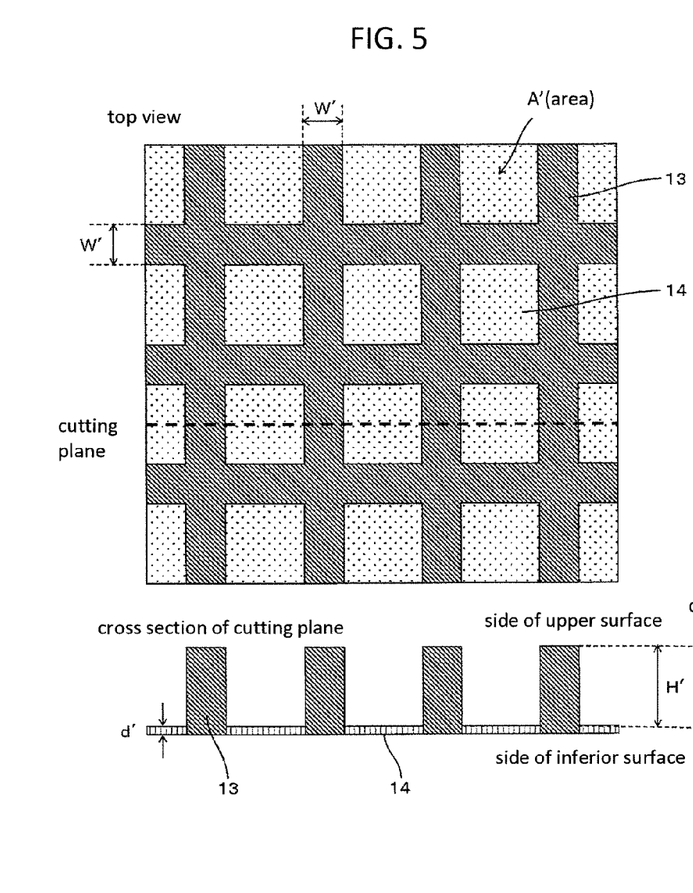
FIG. 5 is a schematic diagram (enlarged view) of the filter.
Figure 6:
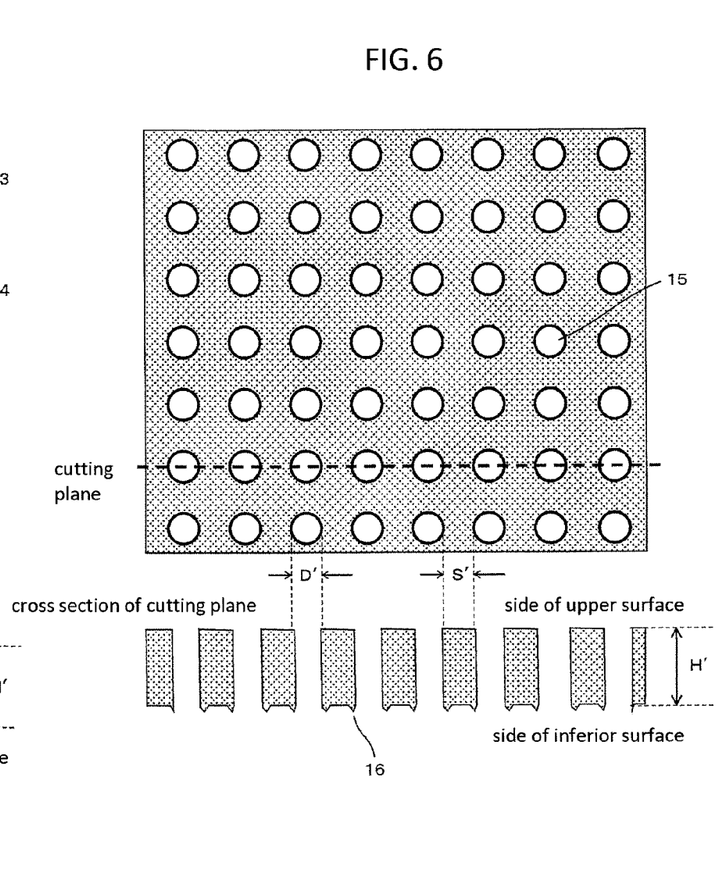
FIG. 6 is a schematic diagram (enlarged view) of the through-hole film portion.
Figure 7:
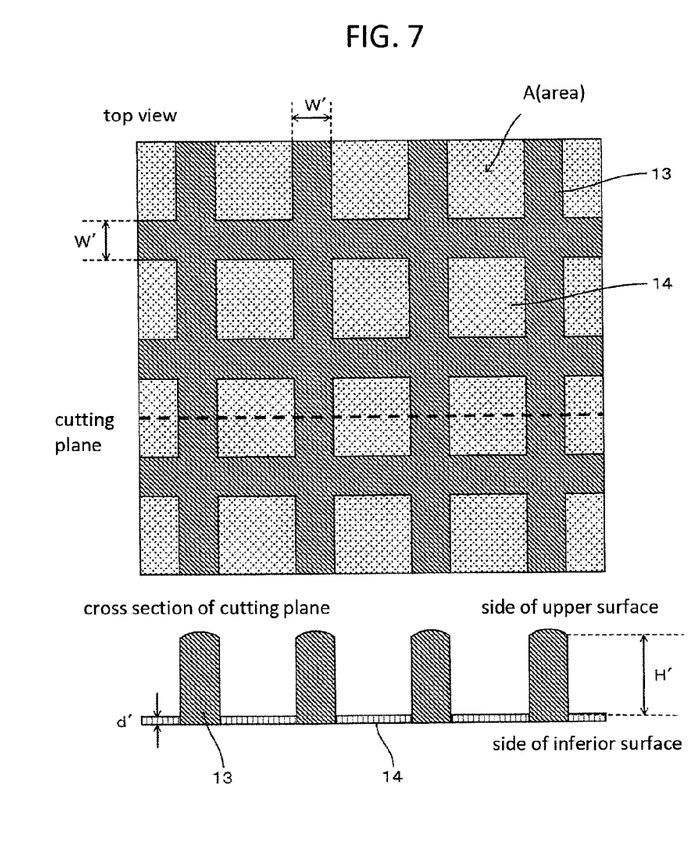
FIG. 7 is a schematic diagram (enlarged view) of the filter.

In embodiment 1 and comparative example 1, the same molds are used. A mixture (resin A) of a silsesquioxane derivative (AC-SQSI-20, product of Toagosei Co., Ltd.) and a photo initiator (DAROCUR1173, product of BASF: 5%) was used as a resin, and resin A was hardened by photo-curing process. In comparative example 1, a quantity of resin A to fill the space of the mold was applied on the polyvinyl alcohol film. FIG. 5 illustrates a schematic diagram (enlarged view) of the filter in comparative example and FIG. 6 illustrates a schematic diagram (enlarged view) of the through-hole film portion in comparative example. On the other hand, in embodiment 1, resin A, whose amount is 90% of the amount needed to fill the space of the mold, was applied on the polyvinyl alcohol film. FIG. 7 illustrates a schematic diagram (enlarged view) of the filter in embodiment 1 and FIG. 6 illustrates a schematic diagram (enlarged view) of the through-hole film portion 14 in embodiment 1. The height of the structure reinforce portion 13 in comparative example was 100 μm corresponding to the depth of the ditch in the mold portion to form the structure reinforce portion, and the upper surface of the structure reinforce portion 13 was plane. On the other hand, the height of the structure reinforce portion 13 in embodiment 1 was about 90% of the depth of the ditch in the mold portion to form the structure reinforce portion, and the upper surface of the structure reinforce portion 13 was saddling curved surface. The reason is that the interaction of resin A and the mold was strong and the contact angle of resin A and the mold was 90 or less degree when the mold was pressed force. It could be confirmed that a protrusion 16 whose height was 5 nm was formed on the edge of the inferior surface of a through-hole 15 in the filter. The reason is that the pillar portion to form the through-hole film portion entered the polyvinyl alcohol film when the mold was pressed force, and as a result, resin A formed at the edge of the pillar portion also entered the polyvinyl alcohol film. A through-hole film portion 14 was the structure to which the portion to form the through-hole film portion in the mold was favorably transferred.

In embodiment 2 and 3, the filter was produced in the same profiles of embodiment 1, except that the height of the pillar portion to form the through-hole film portion 14 in the mold in embodiment 2 and 3 was different from the height in embodiment 1. FIG. 7 illustrates a schematic diagram (enlarged view) of the filter in embodiment 2 and 3, and FIG. 6 illustrates a schematic diagram (enlarged view) of the through-hole film portion 14 in embodiment 2 and 3. In embodiment 2 and 3, as with embodiment 1, the height of the structure reinforce portion 13 was about 90% of the depth of the ditch in the mold portion to form the structure reinforce portion, and the upper surface of the structure reinforce portion 13 was saddling curved surface. It could be confirmed that the protrusion 16 whose height was 5 nm was formed on the edge of the inferior surface of through-hole 15 in the filter. The through-hole film portion 14 was the structure to which the portion to form the through-hole film portion in the mold was favorably transferred.

In embodiment 4 and 5, the filter was produced in the same profiles of embodiment 1, except that the diameter of the pillar portion to form the through-hole film portion 14 in the mold in embodiment 4 and 5 was different from the diameter in embodiment 1. FIG. 7 illustrates a schematic diagram (enlarged view) of the filter in embodiment 4 and 5, and FIG. 6 illustrates a schematic diagram (enlarged view) of the through-hole film portion 14 in embodiment 4 and 5. In embodiment 4 and 5, as with embodiment 1, the height of the structure reinforce portion 13 was about 90% of the depth of the ditch in the mold portion to form the structure reinforce portion, and the upper surface of the structure reinforce portion 13 was saddling curved surface. It could be confirmed that the protrusion 16 whose height was 5 nm was formed on the edge of the inferior surface of through-hole 15 in the filter. The through-hole film portion 14 was the structure to which the portion to form the through-hole film portion in the mold was favorably transferred.

In embodiment 6 and 7, the filter whose through-hole ratio is different from the through-hole ratio in embodiment 1 was produced by using the mold, in which the area of the through-hole film portion enclosed by the ditch of the portion to form the structure reinforce portion was different from the area in embodiment 1. FIG. 7 illustrates a schematic diagram (enlarged view) of the filter in embodiment 6 and 7, and FIG. 6 illustrates a schematic diagram (enlarged view) of the through-hole film portion 14 in embodiment 6 and 7. In embodiment 6 and 7, as with embodiment 1, the height of the structure reinforce portion 13 was about 90% of the depth of the ditch in the mold portion to form the structure reinforce portion, and the upper surface of the structure reinforce portion 13 was saddling curved surface. It could be confirmed that the protrusion 16 was formed on the edge of the inferior surface of through-hole 15 in the filter. The through-hole film portion 14 was the structure to which the portion to form the through-hole film portion in the mold was favorably transferred.

Figure 8:
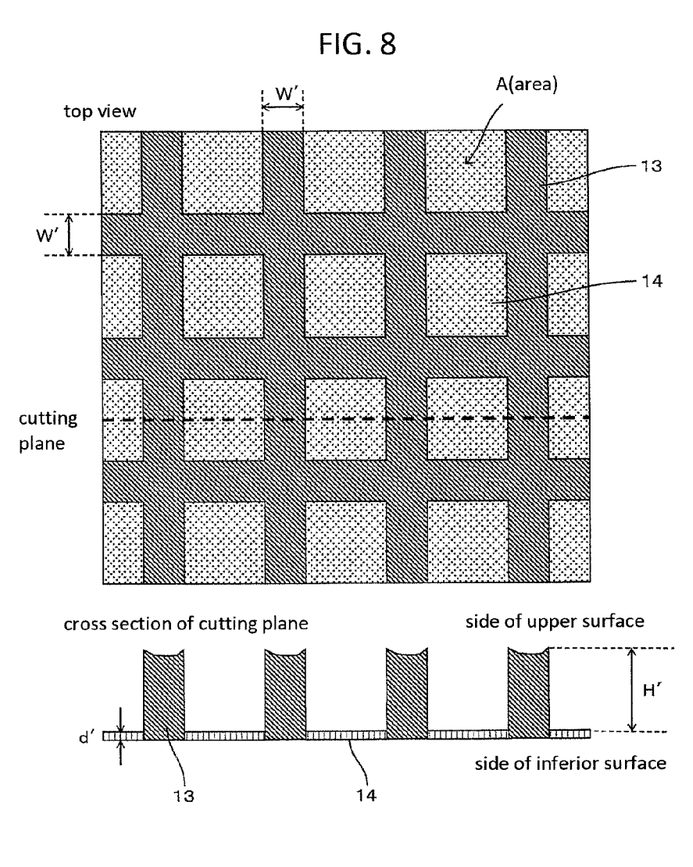
FIG. 8 is a schematic diagram (enlarged view) of the filter.

In embodiment 8, the filter was produced by the same mold as embodiment 1 and a mixture (resin B) of a butyl acrylate (product of Aldrich Corp.) and a photo initiator (DAROCUR1173, product of BASF: 5%). The fine structure of the mold was transferred to resin B by photo-curing process. FIG. 8 illustrates a schematic diagram (enlarged view) of the filter in embodiment 8, and FIG. 6 illustrates a schematic diagram (enlarged view) of the through-hole film portion 14 in embodiment 8. In embodiment 8, the height of the structure reinforce portion 13 was about 90% of the depth of the ditch in the mold portion to form the structure reinforce portion, and the upper surface of the structure reinforce portion 13 was half-pipe shaped curved surface. The reason is that the interaction of resin B and the mold was weak, and the contact angle of resin B and the mold was 90 or more degree when the mold was pressed force. It could be confirmed that the protrusion 16 was formed on the edge of the inferior surface of the through-hole 15 in the filter. The through-hole film portion 14 was the structure to which the portion to form the through-hole film portion in the mold was favorably transferred.

In embodiment 9, the filter was produced in the same profiles of comparative example 1, except that the filter was dipped in HFE7100 (product of Sumitomo 3M Limited) solution (having a mass concentration of 0.1 wt %) of perfluoropolyether (Z-TETRAOL, product of Ausimont Corp.) before the filter was wound, and a low surface energy material was applied on the surface of the filter. As a result of measuring by surface reflection of x rays, it could be confirmed that a low surface energy lawyer whose thickness was 2 nm was formed on the surface of the structure reinforce portion. As a result of measuring surface energy by contact angle method, the surface energy on the low surface energy lawyer was 23 $mJ/m^2$.

In embodiment 10, the filter was produced in the same profiles of comparative example 1, except that the surface of the filter was pressed to a blend film of polydimethylsiloxane resin (reactivity silicone fluids (product of Shin-Etsu Chemical Co., Ltd)) and stiffening agent (ADEKA optomer SP172: 5 wt %) before the filter was wound, and a blend layer was transferred to the surface of the structure reinforce portion. After that, polydimethylsiloxane resin on the surface of the structure reinforce portion was hardened by ultraviolet irradiation. As a result of measuring by contact needle meter, the thickness of gained polydimethylsiloxane resin layer was 1 μm. The elastic modulus of the polydimethylsiloxane resin layer was 30 MPa, measured by atomic force microscope (Dimension Icon (product of Bruker Corporation))

In embodiment 11, polyimide (HD-41-4, product of HD MicroSystems, Ltd.) (resin C) was used as a resin and the filter was produced by the same mold as embodiment 1. The fine structure of the mold was transferred to resin C by photo-curing process. After that, resin C was wound by the reel after heat treatment. FIG. 7 illustrates a schematic diagram (enlarged view) of the filter in embodiment 11, and FIG. 6 illustrates a schematic diagram (enlarged view) of the through-hole film portion 14 in embodiment 11. In the filter of embodiment 11, the height of the structure reinforce portion 13 was about 90% of the depth of the ditch in the mold portion to form the structure reinforce portion, and the upper surface of the structure reinforce portion 13 was saddling curved surface. The reason is that the interaction of resin C and the mold was strong, and the contact angle of resin C and the mold was 90 or less degree when the mold was pressed force. It could be confirmed that the protrusion 16 was formed on the edge of the inferior surface of the through-hole 15 in the filter. The through-hole film portion 14 was the structure to which the portion to form the through-hole film portion in the mold was favorably transferred.

In embodiment 12, polystyrene (product of Aldrich Corp.) (resin D) was used as a resin and the filter was produced by the same mold as embodiment 1. The fine structure of the mold was transferred to resin D by heating process. FIG. 7 illustrates a schematic diagram (enlarged view) of the filter in embodiment 12, and FIG. 6 illustrates a schematic diagram (enlarged view) of the through-hole film portion 14 in embodiment 12. In the filter of embodiment 12, the height of the structure reinforce portion 13 was about 90% of the depth of the ditch in the mold portion to form the structure reinforce portion, and the upper surface of structure reinforce portion 13 was saddling curved surface. The reason is that the interaction of resin D and the mold was strong, and the contact angle of resin D and the mold was 90 or less degree when the mold was pressed force. It could be confirmed that the protrusion 16 was formed on the edge of the inferior surface of the through-hole 15 in the filter. The through-hole film portion 14 was the structure to which the portion to form the through-hole film portion in the mold was favorably transferred.

<Evaluation of the Amount of Filter's Damage After Dispensed>

The filter wound by the reel left for 7 days in the environment of ordinary temperature and normal pressure. After that, the filter was dispensed from the reel. After that, the number of the flaws whose size are 1 or more μm in the filter surface whose area is 1 $mm^2$ was measured by laser microscope. TABLE. 2 illustrates the result. From the result, it is understood that the number of the flaws in embodiment 1 to 12 is about 10% of the number of the flaws in comparative example. The reason is discussed below. In comparative example, the upper surface of the structure reinforce portion in the filter damaged the filter which was adjacent to the structure reinforce portion when the filter was wound by the reel, on the other hand, in embodiment 1 to 12, the damage-reduction structure on the upper surface of the structure reinforce portion efficiently worked and the damage of the filter was suppressed.

It is expected that the adsorption of the air pollutants is suppressed by the low surface energy material formed on the through-hole film portion, because the low surface energy material is absorbed on the entire surface of the filter in embodiment 9. Embodiment 9 explains the method of how the low surface energy material was applied on the entire surface of the filter, but it is also possible that the low surface energy layer is formed only on the surface of the structure reinforce portion by forcing the filter surface on the film whose thickness is 4 nm on the supporting film of perfluoropolyether.

One embodiment explains about the damage reduction of the filter after dispensed as an example, but the effect of the present invention is not limited to the damage-reduction of the filter after dispensed, and the effect of damage reduction is attained in the case that the filter is used by being laminated on other components. For example, in the case that the filter in one embodiment is used by being laminated on the prefilter to eliminate air pollutants in advance whose particle diameters are big, the damage of the prefilter whose mechanical strength is weak is reduced by the damage-reduction structure in one embodiment.

From the above, the present invention reduces the damage of the resin filter with the fine through-hole. Also, providing a protrusion whose height is from 2 to 20 nm on the edge of the inferior surface of the through-hole in the through-hole film portion can offer the resin filter with the fine through-hole in which the adsorption of the air pollutants to the through-hole film portion is suppressed and which has high gas permeability.

DESCRIPTION OF REFERENCE NUMERALS

1 PET film winding reel
2 bath with polyvinyl alcohol solution
3 resin coating machine
4 fine structure formation apparatus
5, 7 bathtub
6 PET film winding reel
8 filter winding reel
9 film transporting roll
10 PET film
11 part to form through-hole film portion
12 part to form structure reinforce portion
12 structure reinforce portion
14 through-hole film portion
15 through-hole
16 protrusion

The invention claimed is:

1. A filter made of resin comprising:
a through-hole film portion; and
a structure reinforce portion, wherein
a through-hole is provided in the through-hole film portion,
the thickness of the through-hole film portion is from 0.5 to 2.0 μm,
the bore of the through-hole is from 0.05 to 0.5 μm,
the thickness of the structure reinforce portion is bigger than the thickness of the through-hole film portion,
the structure reinforce portion encloses the through-hole film portion, and
a damage-reduction structure is provided on an upper surface of the structure reinforce portion, wherein
the damage-reduction structure is at least one of
an uneven structure,
a low surface energy layer with a surface energy that is smaller than a surface energy of the structure reinforce portion, and
a low elastic modulus layer with an elastic modulus that is smaller than an elastic modulus of the structure reinforce portion, and wherein
the uneven structure is a convex curved surface or a concave curved surface.

2. The filter according to claim 1, wherein
a plurality of the through-holes is disposed along the normal direction to a through-hole film portion surface.

3. The filter according to claim 1, wherein
the surface energy of the low surface energy layer is 30 or less mJ/m$^2$.

4. The filter according to claim 1, wherein
the elastic modulus of the low elastic modulus layer is 500 or less MPa.

5. The filter according to claim 3, wherein
a low elastic modulus layer is provided on the surface of the through-hole film portion.

6. The filter according to claim 1, wherein
the filter comprises a protrusion,
the protrusion is provided on the edge of the through-hole in the through-hole film portion, and wherein
a height of the protrusion is from 2 to 20 nm.

7. The filter according to claim 1, wherein
the through-hole film portion and the structure reinforce portion are made of the same resin.

8. The filter according to claim 7, wherein
the through-hole film portion and the structure reinforce portion are cast.

9. A filter made of resin comprising:
a through-hole film portion; and
a structure reinforce portion, wherein
a through-hole is provided in the through-hole film portion,
the thickness of the through-hole film portion is from 0.5 to 2.0 μm,
the bore of the through-hole is from 0.05 to 0.5 μm,
the thickness of the structure reinforce portion is bigger than the thickness of the through-hole film portion,
the structure reinforce portion encloses the through-hole film portion, and
a damage-reduction structure is provided on an upper surface of the structure reinforce portion, wherein
the damage-reduction structure is at least one of
an uneven structure,
a low surface energy layer with a surface energy that is smaller than a surface energy of the structure reinforce portion, and
a low elastic modulus layer with an elastic modulus that is smaller than an elastic modulus of the structure reinforce portion, and wherein
the surface energy of the low surface energy layer is 30 or less mJ/m$^2$, and
a low elastic modulus layer is provided on the surface of the through-hole film portion.

10. The filter according to claim 9, wherein
a plurality of the through-holes is disposed along the normal direction to a through-hole film portion surface.

11. The filter according to claim 9, wherein
the elastic modulus of the low elastic modulus layer is 500 or less MPa.

12. The filter according to claim 9, wherein
the filter comprises a protrusion,
the protrusion is provided on the edge of the through-hole in the through-hole film portion, and wherein
a height of the protrusion is from 2 to 20 nm.

13. The filter according to claim 9, wherein
the through-hole film portion and the structure reinforce portion are made of the same resin.

14. The filter according to claim 13, wherein
the through-hole film portion and the structure reinforce portion are cast.

15. A filter made of resin comprising:
a through-hole film portion; and
a structure reinforce portion, wherein
a through-hole is provided in the through-hole film portion,
the thickness of the through-hole film portion is from 0.5 to 2.0 μm,
the bore of the through-hole is from 0.05 to 0.5 μm,
the thickness of the structure reinforce portion is bigger than the thickness of the through-hole film portion,
the structure reinforce portion encloses the through-hole film portion, and
a damage-reduction structure is provided on an upper surface of the structure reinforce portion, wherein
the damage-reduction structure is at least one of
an uneven structure,
a low surface energy layer with a surface energy that is smaller than a surface energy of the structure reinforce portion, and a low elastic modulus layer with an elastic modulus that is smaller than an elastic modulus of the structure reinforce portion, wherein the filter comprises a protrusion, the protrusion is provided on the edge of the through-hole in the through-hole film portion, and wherein a height of the protrusion is from 2 to 20 nm.

16. The filter according to claim 15, wherein a plurality of the through-holes is disposed along the normal direction to a through-hole film portion surface.

17. The filter according to claim 15, wherein the elastic modulus of the low elastic modulus layer is 500 or less MPa.

18. The filter according to claim 15, wherein the through-hole film portion and the structure reinforce portion are made of the same resin.

19. The filter according to claim 18, wherein the through-hole film portion and the structure reinforce portion are cast.

* * * * *